United States Patent Office 3,694,385
Patented Sept. 26, 1972

---

3,694,385
PROCESS FOR OPEN-CELL RIGID POLYURETHANE FOAMS
Ival O. Salyer, Dayton, and Robert T. Jefferson, West Carrollton, Ohio, assignors to the United States of America as represented by the United States Atomic Energy Commission
No Drawing. Continuation-in-part of application Ser. No. 663,489, Aug. 28, 1967. This application Feb. 19, 1970, Ser. No. 12,834
The portion of the term of the patent subsequent to Jan. 26, 1987, has been disclaimed
Int. Cl. C08g 41/04
U.S. Cl. 260—2.5 A            7 Claims

---

ABSTRACT OF THE DISCLOSURE

Open-cell rigid polyurethane foams are prepared from polyether polyols using, as a pneumatogen, cyclopentane-acetone mixtures with water and, as a nucleating agent, finely divided polyethylene particles.

---

The invention described herein was made in the course of, or under, Contract W–7405–ENG–48 with the United states Atomic Energy Commission.

CROSS-REFERENCE TO RELATED APPLICATION

This is a continuation-in-part of application Ser. No. 663,489 filed Aug. 28, 1967, and now abandoned.

BACKGROUND OF THE INVENTION

This invention pertains to porous or cellular synthetic resinous materials and more particularly to improvements in the manufacture of polyurethane foams of open-cell rigid structure.

Rigid polyurethane foams are well-established commercial products with production reported in millions of pounds per year in the United States. The effect of variations in the reactants and additives are well known, see Saunders and Frisch, "Polyurethanes: Chemistry and Technology. II. Technology," High Polymers Vol. XVI, Part II, Interscience, 1964, at pp. 211 to 218. For many applications, closed-cell foams have been desired and efforts have been directed toward preparing foams having at least 90% closed-cell structure, see Ferrigno, "Rigid Plastics Foams," Reinhold, 1963, pp. 39 and 90; Saunders and Frisch, "Polyurethane: Chemistry and Technology I Chemistry," High Polymers vol. XVI, Part I, Interscience, 1962, at pp. 254 and 255. Typical of the closed-cell rigid foams is that described in British Pat. 947,482, prepared by reacting a diisocyanate and a polyether obtained from propylene oxide and sorbitol. The product had 90% closed cells.

Open-cell flexible foams are well-known, and Saunders et al. (supra) Pt. I at pp. 251 to 253 discuss the factors involved in forming them. Recently, attention has been directed toward preparing open-cell rigid foams for certain applications, Ferrigno, (supra) p. 135, Saunders et al. (supra) Part I at pp. 254 to 258. Chapman et al., in U.S. Pat. 3,288,732, claim a process for open-cell rigid polyurethanes utilizing a mixture of a polyester resin and a polyether resin as reactants, with water and a halogenated hydrocarbon as gas-forming agents.

Eiseman in U.S. Pat. 3,249,546 discloses azeotropic compositions as useful blowing agents for polyurethanes. McGary et al. in U.S. Pat. 3,242,108 discloses low boiling solvents or water as foaming agents for specific polyurethane compositions. Neither reference teaches open-celled rigid foams.

SUMMARY OF THE INVENTION

Closed-cell rigid low density foams suffer from the disadvantage that they generally lack dimensional stability on temperature cycling. Entrapped gases within the cells contract or expand as they are subjected to changes in temperatures and thereby tend to change the over-all dimensions of the foam. A further disadvantage of closed-cell rigid foams is their low efficiency in sound absorption compared with open-cell foams, Ferrigno (supra) p. 110. Furthermore, closed-cell rigid foams can not even be considered for certain applications such as filters, which require an open, permeable structure.

It has now been found that, even with reactants which have heretofore yielded closed-cell rigid foams, open-cell rigid foams may be produced by carrying out the reaction between an organic polyisocyanate and a polyether polyol with a limited amount of water serving as a pneumatogen together with a low-boiling cyclopentane-acetone mixture, in the presence of fine particles of polyethylene as a nucleating agent. Thus the disadvantages of older polyurethane foams prepared from polyisocyanates and polyether polyols may be obivated or minimized by the use of said pneumatogens and nucleating agent.

Further advantages attributable to the present improved process are that the reactants are readily pumped in commercial foaming machines because of their reduced viscosity in the presence of cyclopentane-acetone mixtures. Such reduced viscosities permit more accurate pumping and closer adherence to the desired stoichiometry, thereby resulting in high-quality foams. Furthermore, the foaming reactions in the presence of cyclopentane-acetone mixtures are less vigorous than those heretofore experienced, e.g., in using water alone as a foaming agent wherein a high exotherm may occur, often adversely affecting compressive strength and, in some cases, causing voiding and charring. Even where water is used with low boiling-point liquids, we have found it advantageous to use water in the amount of not more than 3%, preferably about 0.5 to 2%, by weight of the polyether polyols to obtain the unexpected and desirable results of this invention.

The foams produced by this process are rigid, as defined in Saunders et al. (supra) Part II at pp. 239 to 245. As a result of their high content of open cells, normally over 90%, they are readily permeable to gases and liquids. Consequently they have excellent dimensional stability over a wide temperature range and even at temperatures up to their softening point. Dimensional stability may be tested by cycling between −54° C. and +74° C. for several times and determining the maximum dimensional change. Dimensional stability is shown by less than 5% change in dimensions. This dimensional stability is observed even for low density rigid foams, i.e., of less than 3 lb. per cubic foot, which heretofore have been deficient in stability. The foams have uniform cell structure, density and strength. The foamed products obtained by the process described herein are useful in Space Age applications, such as lending rigidity to hollow bodies, in sound absorption and in filters for suspended finely divided solids or tars.

According to the present invention there is provided a process for making a dimensionally stable rigid polyether-type polyurethane foam having at least 90% open cells and a density of less than 3.0 lbs. per cubic foot which comprises reacting together a mixture consisting of an aromatic diisocyanate and a polyether polyol having a hydroxyl number of between about 375 and 700 in an amount sufficient to give an NCO/OH ratio of between about 1.0/1.0 and 1.05/1.0, and foaming said mixture with a blowing agent comprising water in the amount of not more than 2% by weight of the polyether polyol and a mixture of cyclopentane and acetone boiling below 45° C. at atmospheric pressure in the amount of about 10 to 20% by weight of the polyether polyol, in the presence of a nucleating agent comprising polyethylene particles of less than 60 microns particle size in the amount of about 1.0 to 4.0% by weight of the polyether polyol.

It is an object of the present invention to provide rigid polyurethane foams of controlled density of less than 3 lbs. per cubic foot. It is a further object to provide open-cell rigid low-density polyurethane foams having dimensional stability and uniform structure.

The mechanism by which the open-cell rigid foams are formed is not known with certainty but it is proposed that the foaming agents operate in more or less consecutive stages rather than simultaneously. Thus, as the reactants are mixed, sufficient heat is generated to vaporize the cyclopentane-acetone mixture, preferably boiling below 45° C., whereby the foam rises to maximum height. At approximately this stage, the water-isocyanate reaction becomes significant and the resulting surge of carbon dioxide puffs out the thin cell membranes to form an open-cell structure. The cyclopentane-acetone mixture serves as a heat sink to prevent excess temperature rise and charring; additionally, it stabilizes the reaction temperature near the boiling point of the azeotropic mixture of cyclopentane-acetone until the mixture has been substantially vaporized whereupon the temperature rises and the isocyanate-water reaction occurs. The role of nucleating agent is coordinated with that of the foaming agents in providing nucleation sites for the formation of numerous small bubbles, conducive to uniform cell structure, density and strength.

Suitable aromatic diisocyanates include tolylene 2,4- and tolylene 2,6-diisocyanates, m- and p-phenylene diisocyanates, chlorophenylene 2,4-diisocyanate, naphthalene 1,5-diisocyanate, diphenyl 4,4'-diisocyanate, and diphenyl ether diisocyanate. Mixtures of aromatic diisocyanates may be used.

Suitable polyether polyols include the hydroxyl-terminated reaction products of cyclic oxides, e.g., 1,2-alkylene oxides, with polyhydric compounds such as those described in U.S. Pat. No. 2,927,918 (to Dow Chemical Company), Mar. 8, 1960. The reaction products of propylene oxide and glycerine, sorbitol, sucrose or pentaerythritol are particularly useful. Mixtures may be used if desired. For rigid foams it is well known (Saunders et al. (supra) Part II, page 212) that the operable average equivalent weight of polyols is usually between 75 and 150. Conversion to hydroxyl number by the formula (Hydroxyl number=56000÷equivalent weight) gives a hydroxyl number range of 375 to 750 for useful polyether polyols for the purpose of this invention.

The cyclopentane-acetone mixtures are provided in a wide range of compositions boiling below 45° C., but the preferred composition is that containing 70 parts of cyclopentane by volume per 30 parts of acetone by volume. Foaming is slow if cyclopentane-acetone compositions boiling above 45° C. are used. Furthermore, cyclopentane alone is not useful, because it is immiscible with the urethane-forming system; neither is acetone alone useful, because it is retained too well by the system. The amount of cyclopentane-acetone used is preferably about 10 to 20% by weight of the polyether polyol for optimum cell structure. Generally relatively higher amounts result in lower density foams.

The polyethylene particles of less than 60 microns particle size may be either low- or high-density polyethylene but the low-density form is preferred.

If desired there may be included in the polyurethane foam-forming reaction mixture a catalyst, for example, a tertiary amine such as triethylamine or 1,4-diazabicyclo-(2,2,2) octane, a tin compound such as diacetoxydibutyltin or tin (II) octoate, or mixtures thereof. Use of a catalyst is generally preferred, to shorten the rise time. However, useful open cell rigid foams may be made within the scope of this invention without a catalyst present. Higher density foams generally result when no catalyst is added.

There may also be included various additives, not herein claimed, such as surfactants, foam-stabilizing agents, dyes, pigments, fillers, plasticizers, flame-retardants, etc.

The relative quantities of diisocyanate and polyether polyol may be varied to give an NCO/OH ratio of between 0.9/1.0 and 1.1/1.0 or more narrowly between about 1.0/1.0 and 1.05/1.0 taking into account the isocyanate-water reaction; but it is preferred that the stoichiometry be such that there is a slight excess of diisocyanate, as for example where the NCO/OH index is 1.02/1.0.

The reaction between isocyanate and polyol is conveniently initiated at ambient temperature, around 25° C.; the reaction exotherm quickly causes the reaction temperature to rise sufficiently to vaporize the cyclopentane-acetone pneumatogen and induce foaming. Somewhat higher temperatures of reacting may be employed provided decomposition and charring do not occur. The time required for foaming the compositions will vary according to the particular ingredients used and the reacting temperature, but generally ranges between a few minutes and a few hours. The foamed composition may be further cured to eliminate tackiness, at, say, 90–100° C.

It is often desirable to use the quasi-prepolymer and prepolymer systems of foam preparation, see Saunders and Frisch (supra) Part II at pages 201–202. In the preferred embodiment, a portion of the polyol reactant is first reacted with all of the diisocyanate reactant, to produce an isocyanate-terminated prepolymer which is then combined with additional polyol and the other components immediately prior to foaming.

DESCRIPTION OF THE PREFERRED EMBODIMENTS

The invention is further illustrated by, but not limited to, the following examples.

Example 1

This example will illustrate the preparation of a 2.3 pounds-per-cubic-foot foam. A quasi-prepolymer, component "A," was prepared from 78.7 parts by weight of tolylene diisocyanate (a mixture of 2,4- and 2,6-isomers in a weight ratio of 80:20 respectively, exemplified in "Mondur TD–80," Mobay Chemical Company, as described in their data sheet of Feb. 27, 1961); 16.0 parts of the branched polyether polyol prepared by the addition of propylene oxide to glycerol and having a molecular weight of 255 and a hydroxyl number of about 660, and exemplified in "Voranol CP–260," Dow Chemical Company, as described in their bulletin on "Vorane Urethane Polyols"; 2.4 parts of an organic surfactant derived from 2-ethoxyethyl acetate and exemplified in "Selcon R–150," Houdry Process and Chemical Company, as described in their bulletin of 1964; 2.8 parts of a cyclopentane-acetone mixture in a volume ratio of 70:30 respectively; and 0.012 part of diacetoxydibutyltin as catalyst. The reaction mixture was maintained at 40–45° C. until the reaction was complete.

Component "B" containing the bulk of the polyether polyol was prepared from 78.0 parts by weight of the propylene oxide adduct of sorbitol having a molecular weight of 700 and a hydroxyl number of 490, and exemplified in "NIAX Polyol LS–490," Union Carbide Corporation, as described in their product bulletin F–41148 of December 1964; 13.4 parts of CP–260; 5.0 parts of a 70:30 cyclopentane-acetone mixture; 2.2 parts of a microfine low-density polyethylene powder having a melt index of 22, a density of 0.915 and a particle size of less than 60 microns, and exemplified in "Microthene FN–500," U.S.I. Chemicals, as described in their booklet on "Microthene F Microfine Polyolefins"; and 1.1 parts of water.

The components were mixed in a Mobay M-31 foam machine having two Bosch multiple piston, injection-type metering pumps and a mixer. The mixture consisted of 124.5 parts of Component "A" and 89.5 parts of Component "B," and was discharged at a rate of about 70 grams per second into a cardboard box. After rising and setting, the foam was cured at 90° C. overnight. The product had a density of 2.3 pounds per cubic foot and open cell content of about 92% as determined with a Beckman Air Comparison Pycnometer.

Dimensional stability was tested by exposing to 50% relative humidity at room temperature for at least 24 hours and then cycling from −54° C. to +74° C. and determining the percentage of distortion. Test samples measured 6" x 6" x 12". Each cycle consisted of a 10 hour soak at −54° C., followed by uniform heating to +74° C., over a period of 1.5 hours followed by a 10 hour soak at +74° C. and finally uniform cooling back to −54° C. over a period of 1.5 hours. Three complete cycles constituted one test. After thermocycling, the samples were again conditioned to 50% relative humidity at room temperature for 24 hours and measured. The maximum dimensional change was reported as the percentage distortion. The foam produced in this example had a maximum distortion of <0.5%.

Example 2

This example will illustrate the preparation of a 1.70 pounds-per-cubic-foot foam. Component "A" was prepared from 80 parts by weight of TD-80 (see example above), 16 parts of CP-260, 2.4 parts of R-150, 1.6 parts of a 70:30 cyclopentane-acetone mixture and 0.013 part of diacetoxydibutyltin, as catalyst, at a temperature of 40–45° C. The viscosity of the prepolymer was 450 cps. at 25° C.

Component "B" was prepared from 72.5 parts of LS-490, 12.5 parts of CP-260, 12 parts of a 70:30 (by volume) cyclopentane-acetone mixture, 2 parts of FN-500, 1 part of water, and 0.05 part of diacetoxydibutyltin as catalyst.

The components were mixed in a Mobay M-31 foam machine, using 123 parts of "A" with 96.5 parts of "B." Cream time was 45 seconds and rise time 4 minutes. The foam was cured at 90° C. for 16 hours. The product had a density of 1.70 pounds-per-cubic-foot and an open cell content of 96%. Individual boxes of the foam showed the following densities (pounds-per-cubic-foot): 1.68, 1.69, 1.70, 1.72. Dimensional stability on recycling at −54° C. to +74° C. was excellent, as shown by a maximum distortion of 0.43%.

Example 3

This example will illustrate the foaming reaction in the absence of a catalyst.

The reactants and proportions given in Example 2 were used, except that no diacetoxydibutyltin catalyst was used.

Cream time was 1 minute and rise time 25 minutes (compared with 4 minutes in Example 2). The product had a density of 2.35 pounds-per-cubic-foot and an open cell content of 97%. Dimensional stability was excellent.

It is to be understood that although the invention has been described with specific reference to particular embodiments thereof, it is not to be so limited since changes and alterations therein may be made which are within the full intended scope of this invention.

What we claim is:

1. A process for making a dimensionally stable rigid polyether-type polyurethane foam having at least 90% open cells and a density of less than 3.0 pounds-per-cubic-foot which comprises reacting together a mixture consisting of:
   (a) an aromatic diisocyanate and
   (b) a polyether polyol having a hydroxyl number of between about 375 and 700 in an amount sufficient to give an NCO/OH ratio of between about 1.0/1.0 and 1.05/1.0, and foaming said mixture with a blowing agent comprising:
   (c) water in the amount of not more than 2% by weight of the polyether polyol and
   (d) a mixture of cyclopentane and acetone boiling below 45° C. at atmospheric pressure in the amount of about 10 to 20% by weight of the polyether polyol in the presence of:
   (e) a nucleating agent comprising polyethylene particles of less than 60 microns particle size in the amount of about 1.0 to 4.0% by weight of the polyether polyol.

2. A process of claim 1 in which the aromatic diisocyanate is tolylene 2,4-diisocyanate or tolylene 2,6-diisocyanate.

3. A process of claim 1 in which the polyether polyol is the reaction product of propylene oxide with glycerol or sorbitol.

4. A process of claim 1 in which the mixture of cyclopentane and acetone comprises 70 parts of cyclopentane and 30 parts of acetone by volume.

5. A process of claim 1 in which the NCO/OH ratio is about 1.02/1.0.

6. A process of claim 1 in which the reaction is carried out in the presence of a catalyst selected from the group consisting of diacetoxydibutyltin and tin (II) octoate, added at a concentration of between 0.005 and 0.01% by weight of the reactants.

7. A process of claim 1 in which the water is present in an amount of about 0.5 to 2% by weight of the polyether polyol.

References Cited

UNITED STATES PATENTS

| | | | |
|---|---|---|---|
| 3,558,531 | 1/1971 | Salyer et al. | 260—2.5 |
| 3,288,732 | 11/1966 | Chapman et al. | 260—2.5 |
| 3,454,504 | 7/1969 | Murai et al. | 260—2.5 |

DONALD E. CZAJA, Primary Examiner

E. C. RZUCIDLO, Assistant Examiner

U.S. Cl. X.R.

260—2.5 AF, 2.5 AK, 859 R